US008750265B2

(12) United States Patent
Scherzer et al.

(10) Patent No.: US 8,750,265 B2
(45) Date of Patent: Jun. 10, 2014

(54) SYSTEM AND METHOD OF AUTOMATICALLY CONNECTING A MOBILE COMMUNICATION DEVICE TO A NETWORK USING A COMMUNICATIONS RESOURCE DATABASE

(75) Inventors: Shimon Scherzer, Los Gatos, CA (US); Tamir Scherzer, Herzelia (IL); Yariv Lifchuk, Rishon le Zion (IL); Lilach Kornblit Noy, Netanya (IL); Ronny Assa, Kiryat Ono (IL)

(73) Assignee: WEFI, Inc., Marlborough, MA (US)

( * ) Notice: Subject to any disclaimer, the term of this patent is extended or adjusted under 35 U.S.C. 154(b) by 1321 days.

(21) Appl. No.: 12/549,784

(22) Filed: Aug. 28, 2009

(65) Prior Publication Data

US 2011/0013569 A1 Jan. 20, 2011

Related U.S. Application Data

(60) Provisional application No. 61/226,876, filed on Jul. 20, 2009.

(51) Int. Cl.
*H04W 4/00* (2009.01)
*H04W 48/20* (2009.01)
*H04W 88/06* (2009.01)

(52) U.S. Cl.
CPC ............. *H04W 48/20* (2013.01); *H04W 88/06* (2013.01)
USPC ........ 370/338; 709/223; 455/435.2; 455/437; 455/456.3

(58) Field of Classification Search
CPC ............................. H04W 88/06; H04W 48/20
See application file for complete search history.

(56) References Cited

U.S. PATENT DOCUMENTS

| 7,103,661 | B2 | 9/2006 | Klein |
| 7,266,595 | B1 | 9/2007 | Black et al. |
| 7,466,986 | B2 * | 12/2008 | Halcrow et al. ............ 455/456.2 |
| 7,483,984 | B1 | 1/2009 | Jonker et al. |
| 7,676,216 | B2 * | 3/2010 | Stieglitz et al. ............... 455/410 |
| 7,849,173 | B1 * | 12/2010 | Uhlik ............................ 709/223 |
| 8,126,476 | B2 * | 2/2012 | Vardi et al. ................. 455/456.1 |
| 2003/0182392 | A1 * | 9/2003 | Kramer ......................... 709/217 |
| 2004/0066759 | A1 | 4/2004 | Molteni et al. |
| 2004/0192264 | A1 * | 9/2004 | Liu et al. .................... 455/414.1 |
| 2004/0260760 | A1 * | 12/2004 | Curnyn ......................... 709/201 |
| 2005/0059416 | A1 * | 3/2005 | Ono ............................. 455/457 |

(Continued)

*Primary Examiner* — Kibrom T Hailu
*Assistant Examiner* — James P Duffy
(74) *Attorney, Agent, or Firm* — Finnegan, Henderson, Farabow, Garrett & Dunner, LLP

(57) ABSTRACT

A system, method, and computer program product of automatically connecting a mobile communication device to a communication network using a network resource classification database includes detecting a communication network access point using the mobile communication device and reporting network attributes associated with the access point to a resource classification server. The server analyzes and stores the network attributes, determines auxiliary data related to the access point, and uses a rules database to determine a category identifier associated with the access point. The server creates a resource classification characterizing the access point based upon the network attributes, auxiliary data, and category identifier. The mobile communication device queries the server, receives a resource classification, and connects to an access point based upon the received resource classification.

39 Claims, 10 Drawing Sheets

(56) References Cited

U.S. PATENT DOCUMENTS

| | | |
|---|---|---|
| 2005/0070279 A1 | 3/2005 | Ginzburg et al. |
| 2005/0221858 A1* | 10/2005 | Hoddie .................... 455/557 |
| 2006/0030350 A1* | 2/2006 | Mitchell ................... 455/522 |
| 2006/0168438 A1 | 7/2006 | Klein |
| 2006/0221917 A1* | 10/2006 | McRae ..................... 370/338 |
| 2007/0066304 A1 | 3/2007 | Lee |
| 2007/0167174 A1* | 7/2007 | Halcrow et al. ........... 455/456.2 |
| 2008/0013487 A1 | 1/2008 | Molteni et al. |

* cited by examiner

SYSTEM AND METHOD OF AUTOMATICALLY CONNECTING A MOBILE COMMUNICATION DEVICE TO A NETWORK USING A COMMUNICATIONS RESOURCE DATABASE

CROSS REFERENCE TO RELATED DOCUMENTS

The present application claims the benefit of priority of U.S. Provisional Patent Application Ser. No. 61/226,876 filed on Jul. 20, 2009. The contents of the U.S. Provisional Patent Application are incorporated below by reference.

FIELD OF THE INVENTION

The present invention relates to mobile communications devices and communications networks. More specifically, the present invention relates to systems and methods for detecting network communications access points and automatically connecting a mobile communications device to the network using a communications resource database.

BACKGROUND OF THE INVENTION

The telecommunications industry today provides many proprietary systems for users to access communications networks. Individual telecommunications service providers often operate separate access points to the networks. The access points provided by the service providers usually include proprietary equipment to provide a user an entry-way to the individual service provider's proprietary network.

Access points for wireless telephones include General Packet Radio Server (GPRS) towers and antennae. Access points for land line communications include Digital Subscriber Line (DSL) technology, cable modems, Wi-Fi (IEEE 802.11b compliant) technology, or Plain Old Telephone Service (POTS).

A consortium of independent companies have come together to agree on a set of common interoperable products based on Wi-Fi (IEEE 802.11b compliant) standards. The consortium promotes standards with the aim of improving the interoperability of wireless local area network products based on the Wi-Fi standards. The consortium certifies products via a set of defined test procedures to establish interoperability. Those manufacturers with membership in the consortium and whose products pass these interoperability tests can mark their products and product packaging with the Wi-Fi logo.

A Wi-Fi access point broadcasts its service set identifier (SSID), or network name via data packets that are called "beacons." The beacons from the access point are transmitted, and a client device that receives the beacon may decide whether to connect to the access point. If multiple access points with the same SSID are in range of the client device, hardware or software on the client device may determine with which of the two access points the client device will connect.

Wi-Fi standards leave connection criteria open to the client device. This flexibility also means that one wireless client device may perform substantially better than another. The Wi-Fi signal is akin to a radio signal and transmits in the air. The Wi-Fi signal has similar properties to a non-switched wired Ethernet network in which data collisions can occur. However, unlike a wired Ethernet network, Wi-Fi cannot detect collisions, and instead uses an acknowledgment packet for every data packet sent. If a sender receives no acknowledgement within a certain time period, the sender retransmits the corresponding data packet.

A Wi-Fi network may be used to connect computers and other client devices to each other, to the Internet, and to wired networks (which use IEEE 802.3 or Ethernet). As wireless client devices have become pervasive, rapid growth of wireless data services has mandated high-density and indoor deployment of access points. While traditional high-density cellular network deployment may be extremely expensive unless customers own the access equipment, Wi-Fi access point equipment is well proven, and almost every Internet-capable terminal receives Wi-Fi.

However, except for enterprise deployments, Wi-Fi equipment is not consistently deployed and managed. This deployment scenario poses some fundamental challenges to carriers that desire to leverage Wi-Fi networks to relieve data traffic congestion but are committed to service quality (QoS). For example, a cellular terminal is always connected, and users are not accustomed to executing a "connect" action over cellular terminals. Accessing a Wi-Fi access point, on the other hand, requires a user to perform a "connect" action to gain access to the network. Also, while Wi-Fi is integrated into many cellular devices, most users connect to Wi-Fi only when the location or resource or access point is familiar, for example, in a favorite coffee shop, bookstore, or hotel.

In the past, telecom providers and cellular operators also provided call control functions such as establishing and terminating a connection between user devices. Call control functions include establishing a quality of service (QoS) for a communication session that includes voice quality, data quality, and data transfer rates. However, cellular operators cannot be involved in connecting to un-authorized Wi-Fi resources, such as an unlocked Wi-Fi network in a private home, and therefore cannot provide a seamless Wi-Fi connection.

Consequently most users will not switch from a cellular to a Wi-Fi connection voluntarily. In addition, since Wi-Fi networks are often owned by users and not by the network carriers, Wi-Fi resources, access points, and networks often exhibit unpredictable behavior, further reducing users' potential engagement. Although Wi-Fi is prevalent, seamless Wi-Fi connections are quite rare, thereby rendering negligible value to a cellular operator.

SUMMARY OF THE INVENTION

The system and method of the present invention provides a mobile communication device that detects a communication network access point. The mobile communication devices report network attributes associated with the detected communications network access points to a resource classification server. The resource classification server stores the network attributes and builds a resource classification database to categorize communication network access points, hotspot locations, and radio attributes. When attempting to connect to a communication network, mobile communication device queries the resource classification database that includes the network attributes of the detected network access point. The resource classification database may include auxiliary data related to the network access point and hotspot location as well. The resource classification database also includes a category identification of the detected network access point. The mobile communications device receives a resource classification characterizing the detected access point and leverages the resources that have been classified to automatically connect to a network access point based upon the received resource classification. Information may be made available to users by caching information in the memory of the users' mobile communication device and by using a cellular connection.

The mobile communication device in accordance with the present invention scans the access points, or access nodes, and provides network attributes to the resource classification server. The network attributes are analyzed and combined with auxiliary data from external data sources and resource databases, and the results are used to classify the network access points. Based upon the classification of the network access points, the mobile communication device may then connect to a network.

Unleashing the full impact of Wi-Fi radio in cellular terminals requires a seamless relocation of data traffic from cellular to Wi-Fi access. Most users are already connected to a cellular network and will not switch from their cellular connection to a Wi-Fi connection voluntarily. Automatic switching of a user's terminal to Wi-Fi requires tight connection control and knowledge of Wi-Fi resources in reach, including ownership of the resources, performance capabilities of the network, and the like. The system and method of the present invention provides these capabilities and others to facilitate the use of existing "free-to-the-public" Wi-Fi resources. The system and method of the present invention provides network and "Wi-Fi knowledge" to mobile communication devices by building and deploying resource classification processes and a resource classification database.

Wi-Fi resources may include communication networks, network access points, and the hardware and software necessary to utilize computers and other communication devices to communicate with one another on the communication network. Wi-Fi hotspots may include the physical location where a user would gain access to the communication network, such as Internet access over a wireless local area network (LAN) through the use of a shared connection and a single router.

The disclosed embodiment includes a system, method, and computer program product for detecting network communications access points and automatically connecting a mobile communications device to the network using a communications network resource classification database. A system, method, and computer program product in accordance with the embodiments identifies available communications networks and establishes a connection between the mobile device and the network. The system and method of seamlessly and automatically establishing new network connections may be applied in situations where conventional approaches to gaining network access are not acceptable and where network traffic conditions may benefit by offloading network traffic automatically.

The system and method of the embodiments bridges the gap between cellular and Wi-Fi technologies and capabilities through the construction of a virtual control over Wi-Fi radios and by building a Wi-Fi network information base that is similar to those provided by control channel and network statistics in a cellular network. The system and method of the present invention builds an information base by creating a comprehensive database of Wi-Fi resources around the world by employing user communities to find, locate, and categorize Wi-Fi resources. Conventional techniques have previously relied upon formal reports or drive down operations. The system and method of the embodiments executes comprehensive data mining procedures through this network resource classification database to classify "intentionally public" and other available Wi-Fi resources. The system and method of the present invention provides user's mobile communication devices with administrative information and quality-of-service information regarding Wi-Fi resources based on network access point attributes. The information may then be used to make a "legitimacy decision" regarding the available Wi-Fi resources. Users with mobile communication devices may leverage this information to select the best Wi-Fi resources for access and to automatically execute a successful connection to legitimately available resources while preventing un-authorized accessing of random network resources.

The embodiments are configured to automatically detect network communications access points in hotspot locations and to connect a mobile communications device to the network. The system includes at least one of the following: a resource classification server, an access points database, an auxiliary database, and a category database. The resource classification server may include a network resource processor. The access points database houses network attributes, while the auxiliary database stores auxiliary data related to the network access point and hotspot location. Similarly, the category database stores category identifiers associated with the network access points. The system may further include a network resource classification database that holds resource classification records characterizing the network access points. A rules database is used to store and apply rules to classify Wi-Fi hotspots. The rules may include classification determinations and hotspot characterization rules regarding the performance and type of Wi-Fi hotspots.

The embodiments extend the capabilities of Wi-Fi communication networks by automatically detecting legitimate network communications access points and connecting a mobile communications device to the network using a resource classification database.

These and other advantages, aspects, and features of the present invention will become more apparent from the following detailed description of embodiments and implementations of the present invention when viewed in conjunction with the accompanying drawings. The present invention is also capable of other embodiments and different embodiments, and details can be modified in various respects without departing from the spirit and scope of the present invention. Accordingly, the drawings and descriptions below are to be regarded as illustrative in nature, and not as restrictive.

BRIEF DESCRIPTION OF THE DRAWINGS

The accompanying drawings illustrate an embodiment of the invention and depict the above-mentioned and other features of this invention and the manner of attaining them. In the drawings.

DETAILED DESCRIPTION OF THE INVENTION

Figure 1:
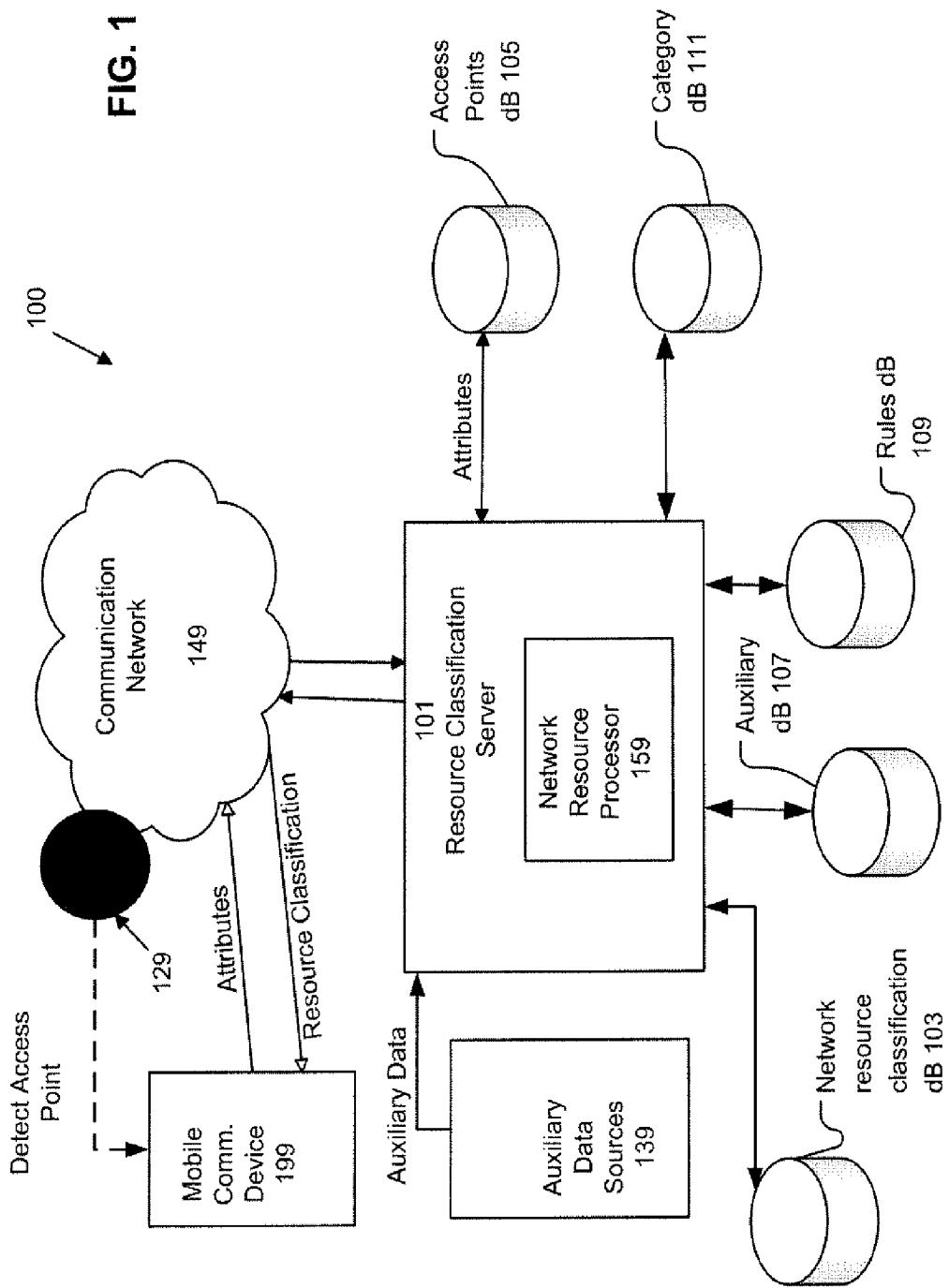
FIG. 1 illustrates a system for automatically connecting a mobile communication device to a network using a resource classification database in accordance with the present invention.

The following detailed description of the invention refers to the accompanying drawings and to certain preferred embodiments, but the detailed description does not limit the invention. The scope of the invention is defined by the appended claims and equivalents as it will be apparent to those of skill in the art that various features, variations, and modifications can be included or excluded based upon the requirements of a particular use.

The present invention provides a system, method, and computer program product for automatically connecting a mobile communication device to a network using a resource classification database. The system, method, and computer program product classifies wireless network resources by creating and maintaining the resource classification database. Network attributes associated with a detected network access point are received at a resource classification server. The received network attributes are stored in an access points database and analyzed. Auxiliary data related to the network access point is determined based upon the analyzed network attributes. Auxiliary data may be Web-based or may be provided by auxiliary data sources outside the resource classification server. Application program interfaces (APIs) may be provided by these sources and used to access additional auxiliary information regarding hotspot locations where the access points are located. The auxiliary data related to the network access point may be stored in an auxiliary database, and a rules database is used to determine a category identifier associated with the network access point. The category identifier may be stored in an access points category database. A resource classification database record characterizing the detected network access point and the hotspots is created and stored in the resource classification database. The database record includes the received network attributes, the auxiliary data related to the network access point, and the category identifier associated with the detected network access point. Using a mobile communication device, the system and method of the present invention allows a user to send network attributes to a resource classification server. The network attributes are related to a detected network access point. By characterizing and classifying the network access point, the system and method of the present invention may facilitate automatic connection of the mobile communication device to a network access point.

The present invention includes a system, method, and computer program product for automatically connecting a mobile communication device to legitimately available networks. A system, method, and computer program product in accordance with the present invention creates and maintains a network resource classification database that characterizes detected network access points, including network attributes, auxiliary data related to the network access point, and a category identifier associated with the detected network access point.

The computer program product is a computer readable storage media that includes one or more computer-readable instructions configured to cause one or more computer processors to execute operations including detecting a communication network access point using the mobile communication device and reporting network attributes associated with the communication network access point. The computer-readable instructions are further configured to cause one or more computer processors to execute operations including querying the network resource classification database by the mobile communication device, where the network resource classification database includes the network attributes of the detected communication network access point, auxiliary data related to the communication network access point, and a category identification of the detected network access point. Further, the computer-readable instructions are configured to cause one or more computer processors to execute operations including receiving, by the mobile communication device, a resource classification characterizing the detected network access point and connecting the mobile communication device to the network access point based upon the received resource classification.

Similarly, the computer readable storage media that includes one or more computer-readable instructions configured to cause one or more computer processors to execute operations including detecting a communication network access point using the mobile communication device and reporting network attributes associated with the communication network access point. The instructions further cause the processors to execute operations including querying the network resource classification database by the mobile communication device, where the network resource classification database includes the network attributes of the detected communication network access point, auxiliary data related to the communication network access point, and a category identification of the detected network access point. The instructions then cause the processors to execute operations including the mobile communication device receiving a resource classification characterizing the detected network access point and connecting the mobile communication device to the network access point based upon the received resource classification.

FIG. 1 illustrates an exemplary system for automatically connecting a mobile communication device to a network using a resource classification database in which techniques and methods in accordance with the present invention may be performed. As shown in FIG. 1, the system 100 includes resource classification server 101, which is connected to a communications network 149. Resource classification server 101 includes network resource processor 159. Communications network 149 may include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like. In addition, the communications networks employed can be the same or different networks.

Wireless access point 129 is shown in FIG. 1 as a device or other communication hub that allows mobile communication device 199 to connect to a wireless communication network 149 using Wi-Fi, Bluetooth, or related standard communication protocols. Access point 129 may connect to a wired network and relay data between the mobile communication device 199 and wired devices on the network 149. As used throughout this description, access point 129 depicts an entry point to a communication network, such as communication network 149. Wi-Fi hotspots may include the physical location where a user would gain access to the communication network, such as Internet access over a wireless local area network (LAN) through the use of a shared connection and a single router.

Resource classification server 101 connects through communications network 149 to mobile communication device 199. Mobile communication device 199 may include any suitable servers, workstations, personal computers (PCs), laptop computers, PDAs, Internet appliances, set top boxes, modems, handheld devices, telephones, cellular telephones, wireless devices, smart phones, net books, other devices, and the like, capable of performing the processes of the disclosed exemplary embodiments. System 100 also includes access points database 105, category database 111, rules database 109, and network resource classification database 103. System 100 may also include auxiliary data sources 139 and auxiliary database 107.

A user (not shown) may be a person, group, or organization, and the like. Users may access system 100 performing a method in accordance with the present invention. For clarity and brevity, in FIG. 1 a single mobile communication device 199 is shown, as well as a single resource classification server 101, communication network 149, and data sources 139 and databases 103, 105, 107, 109, 111, but it should be understood that any number of devices, servers, sources, and databases may be accessed or connected by communication networks with which to perform methods in accordance with the invention.

The system 100 includes a mobile communication device 199 configured to detect a communication network access point. Mobile communication device 199 is further configured to report network attributes associated with the communication network access point to resource classification server 101. Mobile communication device 199 is also configured to query the network resource classification database 103 where the network resource classification database 103 includes network attributes of detected communication network access points 129, data from auxiliary data sources 139 that is related to the communication network access point 129, and a category identification of the detected network access point 129. The mobile communication device 199 is further configured to receive a resource classification characterizing the detected network access point 129 and connect to the network access point 129 based upon the received resource classification.

The system 100 includes a resource classification server 101 configured to receive network attributes from mobile communication device 199. The network attributes are associated with a detected network access point 129. Resource classification server 101 may employ network resource processor 159 to store the received network attributes in an access points database 105 and to analyze the stored network attributes associated with the network access point 129. The resource classification server 101 may further employ network resource processor 159 to determine auxiliary data related to the network access point 129 based upon the analyzed network attributes and to store the auxiliary data related to the network access point in an auxiliary database 107. Network resource processor 159 may be further configured to use a rules database 109 to determine a category identifier associated with the network access point 129 and to store the category identifier in an access points category database 105.

Network resource processor 159 creates and stores a resource classification database record in a network resource classification database 103 that characterizes the detected network access point 129. The database record in the resource classification database 103 includes the received network attributes, the auxiliary data related to the network access point 129, and the category identifier associated with the detected network access point 129.

Figure 2:
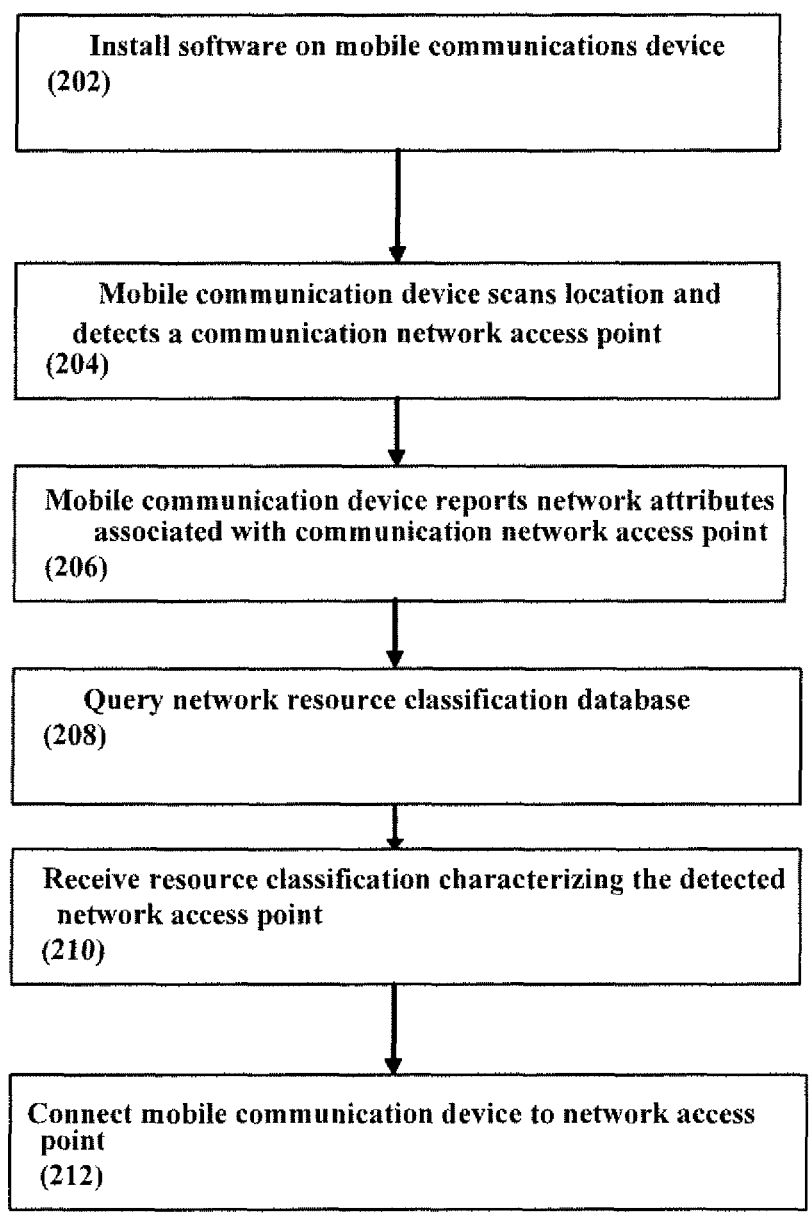
FIG. 2 shows a process flow chart for a method for automatically connecting a mobile communication device to a network using a resource classification database in accordance with the present invention.
Figure 3A:
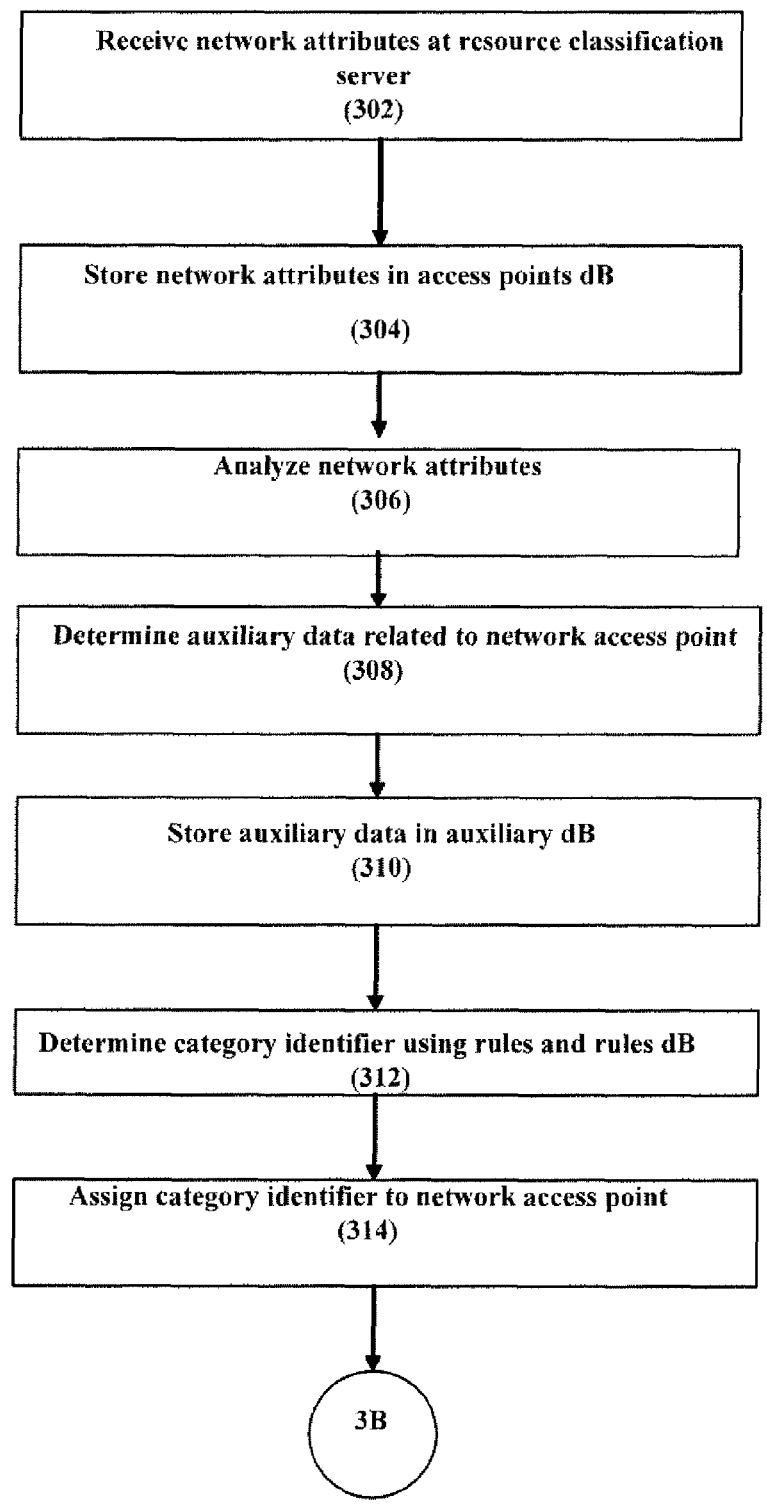
FIGS. 3A-3B show a process flow chart for a method for classifying wireless network resources by creating a resource classification database in accordance with the present invention.
Figure 3B:
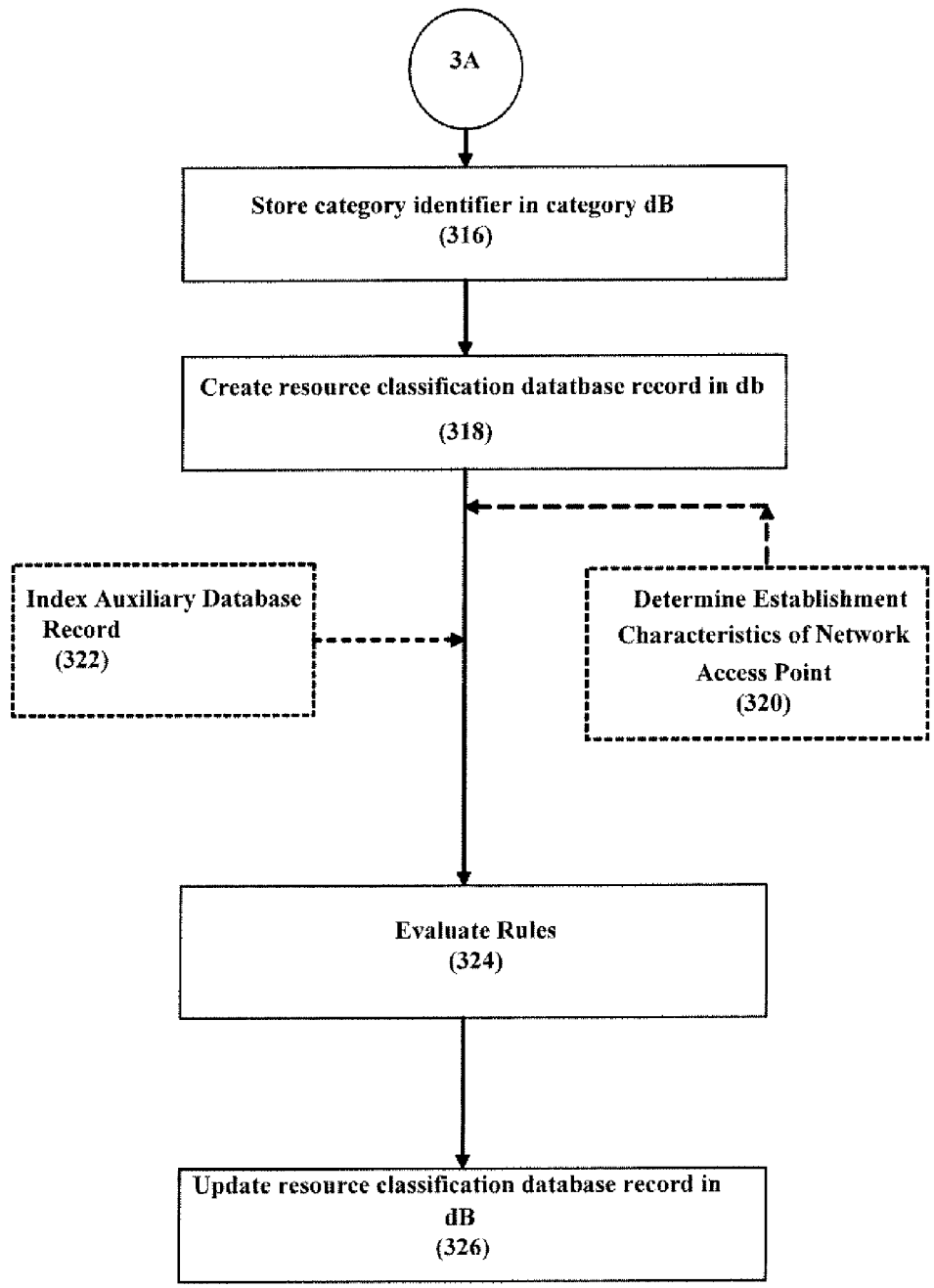

FIGS. 2 and 3 are process flow diagrams that illustrate a method of automatically connecting a mobile communication device to a network using a network resource classification database in accordance with the present invention. As shown in step 202 of FIG. 2, a software program is installed on the mobile communication device 149 via a software download or other transfer mechanism. The software program installed on mobile communication device 149 enables mobile communication device to interact with system 100. In step 204, the process of creating the network resource classification database 103 begins when a connection manager device (not shown) of network resource processor 159 executes a connection procedure and passes connection information from resource classification server 101 through communication network 149 to an access point 129, which translates the connection information into a radio signal and sends it to mobile communication device 199.

In step 204, mobile communication device 199 scans and evaluates Wi-Fi resources in proximity. The scan may include detecting communication network access points by scanning a radio neighborhood with the mobile communication device to evaluate network access points. In step 206, mobile communications device 199 reports network attributes associated with the communication network access point 129 to resource classification server 101. Mobile communication device 199 may evaluate network access points (that is, network resources) when mobile communication device 199 is not required to transmit or receive data. Optionally, mobile communication device 199 may evaluate network resources while conducting data transfers by masking the connection switching from higher communication layers.

Mobile communication device 199 may evaluate network resources passively or actively. Passive evaluation may include copying SSID and signal levels and like actions not requiring connection to the network, while active evaluation may include executing association and communication with a network server via network access point 129 to evaluate connection speed, find network information such as external IP, gateway IP, and the like. Active evaluation may also include mobile communication device 199 sequentially associating and connecting to each Wi-Fi access point in reach and exchanging some transmission with public websites or with resource classification server 101.

Mobile communication device 199 may periodically report evaluation results to resource classification server 101 or may report evaluation results in a continuous fashion. Once, resource classification server 101 receives the network attributes associated with a detected network access point 129, resource classification server 101 stores the network attributes in access points database 105. The network attributes reported may include the time of detection/connection, such as the time/date first detected and the time/date last detected. The network attributes reported may also include a service set identifier (SSID), which may be read directly by mobile communication device 199 through an 802.11 scan. Similarly, the network attributes may include a media access control (MAC) address that may be determined through 802.11 scan as well as an encryption type.

The network attributes reported may also include whether Internet access is available or not available and a type of encryption used. These determinations may be made after successfully connecting to a network server or a Website. The gateway IP address may also be determined and reported while connected to a network. Similarly, the DNS address and owner of network access point 129 may be determined and reported in a like fashion. The external network IP may be determined and reported while connecting and communicating with resource classification server 101.

In addition, averages and variance of signal levels (RSSI, for example, based on multiple observations) may be read directly during an 802.11 scan. Likewise, average data speed, amounts of data, and connection duration, based on multiple evaluation reports, may be measured by connected devices while transferring data. The values may be averaged over multiple connections. Location is another network attribute that may be determined and reported to resource classification server 101. Location may be determined by GPS, cell-location, geographical coordinates, street address, IP location, user name, external database, detecting a terminal, by a user entering the information, or by detected similarities to other resources in proximity.

The type of login may also be detected and reported as a network attribute, including whether the type of login is free, by paid or free landing page, and the like. After successfully connecting, mobile communication device 199 may attempt to access a website (example: HTTP get). A landing page access point may respond with re-direction response. Also, users may manually or otherwise report whether the landing page is free or with paid access. Also, a redirected link of the access point 129 may also be determined and reported as a network attribute associated with access point 129.

The number of unique users connected during a given period may also be reported as a network attribute associated with the communication network access point. Since every connecting terminal or mobile communication device reports its connection, all resource classification server 101 connections to specific access points may be recorded, and the number of unique connections can be determined. Connections may be made while accessing the Internet and/or by simply evaluating network hotspot performance as described above. Similarly, the average and variance connection time to the access point can be determined similar to the manner in which the number of connections is determined and reported. Further, if a WISPr login URL exists, it may be reported as a network attribute to resource classification server 101.

Idling mobile communication devices may be programmed to periodically "wake-up," execute an 802.11 scan and, if the scan detects the presence of a Wi-Fi access point, execute 802.11 connection procedures. If a connection is successfully made, the mobile communication device may communicate with the access point server to determine the parameters mentioned above (IP addresses, location by GPS or cellular network, data speed, and the like). Once the data is acquired, the terminal can either locally store or immediately report to resource classification server 101. If the network attributes are locally stored, the network attributes may be reported when a more permanent network connection has been established, such as at a home, office, and the like.

Once a mobile communication device detects a potential Wi-Fi resource by SSID, MAC address, signal strength, and the like and reports network attributes associated with the network access point, in step 208, mobile communication device 199 queries resource classification database 103 via resource classification server 101 and receives an "opinion" regarding the detected seen resource in step 210. The opinion may be a resource classification characterizing the detected network access point 129. Once mobile communication device 199 receives the resource classification characterizing the detected network access point 129, in step 212, mobile communication device 199 may connect to the network access point 129 based upon the received resource classification. The reporting and querying exchange with the servers can be executed over "out of band" connections, for example a cellular data channel. If a cellular data channel is not available, the exchange may take place once a Wi-Fi connection is achieved, for example, with another Wi-Fi resource. In this fashion, users may employ mobile communication devices to gather Wi-Fi resource information using network attributes and report the attributes to resource classification server. The attributes may be used to build a database of access points and provide hotspot locations for users. This database of access points and hotspot locations may then be used to connect mobile communication device 199 to an intentionally public network resource based upon the qualified access point as well as to offload network traffic from a separate network access point.

As outlined above and in FIG. 3, when mobile communication device 199 reports network attributes associated with the communication network access point 129, resource classification server 101 receives the network attributes in step 302 and stores the received network attributes in access points database 105 in step 304. In order for mobile communication device 199 to receive a resource classification that accurately characterizes the Wi-Fi access point, the resource classification server 101 analyzes the stored network attributes associated with the network access point 129 in step 306 of FIG. 3.

The analysis of the stored network attributes may include location information, such as geographical data related to access point 129. For example, access points database 105 includes all scanned access points and contains data about the connectivity attributes of each access point. Also, access points database 105 includes internal data loaded from the access point 129 as its MAC-address, SSID, encryption method, and the like. Each access point is assigned a unique ID called AP Id, which is used by the system and method of the present invention to classify wireless network resources by building the resource classification database 103. New access points are reported by the client mobile communication device 199 after a connection is made. Existing access point records in the access points database 105 are updated online whenever a user of a mobile communication device detects a known access point. Such updates may include changes in SSID, other connectivity parameters, and the like.

In step 308, the system and method of the present invention combines the received network attributes stored in access points database 105 with auxiliary data from auxiliary data sources 139. Auxiliary data may be Web-based or may be provided by auxiliary data sources outside the resource classification server. Application program interfaces (APIs) may be provided by these sources and used to access additional auxiliary information regarding hotspot locations where the access points are located. For example, the embodiments of the present invention may use SSID and a general location address to inquire as to the type of establishment in which the hotspot is located and the exact street address. The system may use information from access point database 105 in tandem with auxiliary data from auxiliary data sources 139 to evaluate whether the Internet was accessed from the location address, how many people were connected at this location, and classify the location of the access point as a "free hotspot" based upon hotspot characterization rules. The resulting classified access points may be cataloged as a list of Wi-Fi hotspots. Wi-Fi hotspots denote a location where a user may access the Internet via Wi-Fi. Auxiliary data sources 139 may also provide geographical data, including latitude and longitude or street location information. The geographical data may include global positioning data, cell locations, and the like. This geographical data may be saved in a mapped access points table 407 (discussed below with regard to FIG. 4) and may be stored in auxiliary database 107 in step 310. The auxiliary data may also include information provided by auxiliary data sources 139, such as geo-spatial information of the mobile communication device, which may be inputted manually with the client software or a Web site associated with resource classification server 101. Additionally, auxiliary data may be provide in a modular form where an auxiliary data source provides a database or other source of auxiliary data to be used by resource classification server 101 to facilitate classifying access points and hotspot locations. For example, databases of geographical auxiliary data may be purchased from multiple sources compiled in multiple countries. The auxiliary data provided may include additional co-operations performed in conjunction with other Wi-Fi providers or access point owners. Similarly, auxiliary data sources 139 may facilitate internal processes running on resource classification server 101 or mobile communication device 199 to detect location using the Internet or another communication network as the main source.

Network attributes include details about the access point location such as the place name, phone number, email address, category of location, and the like. In step 312, the system and method of the present invention analyzes the network attributes and the auxiliary data related to the network access points and processes this information with categorization rules stored in rules database 109. The rules are applied to the network attributes and auxiliary data related to the network access point to categorize the network access point. A category identifier is assigned to the network access point hotspot in step 314.

Each hotspot location associated with a physical network access point with specific characteristics is assigned with a category describing the hotspot's kind of place, such as hotel, restaurant, airport, and the like. This data is saved in a hotspots table 409 (shown in FIG. 4), and the category identifier is stored in category database 111 in step 316.

The category field in this table 409 is a calculated field. An access point may have more than one category. The rules calculation to determine a category identifier is performed by resource classification server 101, which determines the category saved in AP content table 409. The access points' categories are saved in AP categories table 411 in category database 111. The primary key of the table 411 is a combination of the AP id, referenced from the AP table 405, and the category type. Each access point references at least one category. If a single category is used, the access point categories table 411 points to that category, otherwise, the system and method of the present invention automatically assigns a most significant category to the access point and uses a reference to it. The rules calculation performed by resource classification server 101 takes into account the existing categories found for the specific access point and an internal prioritization between them. An exemplary rules calculation is shown below in an implementation example.

Figure 4:
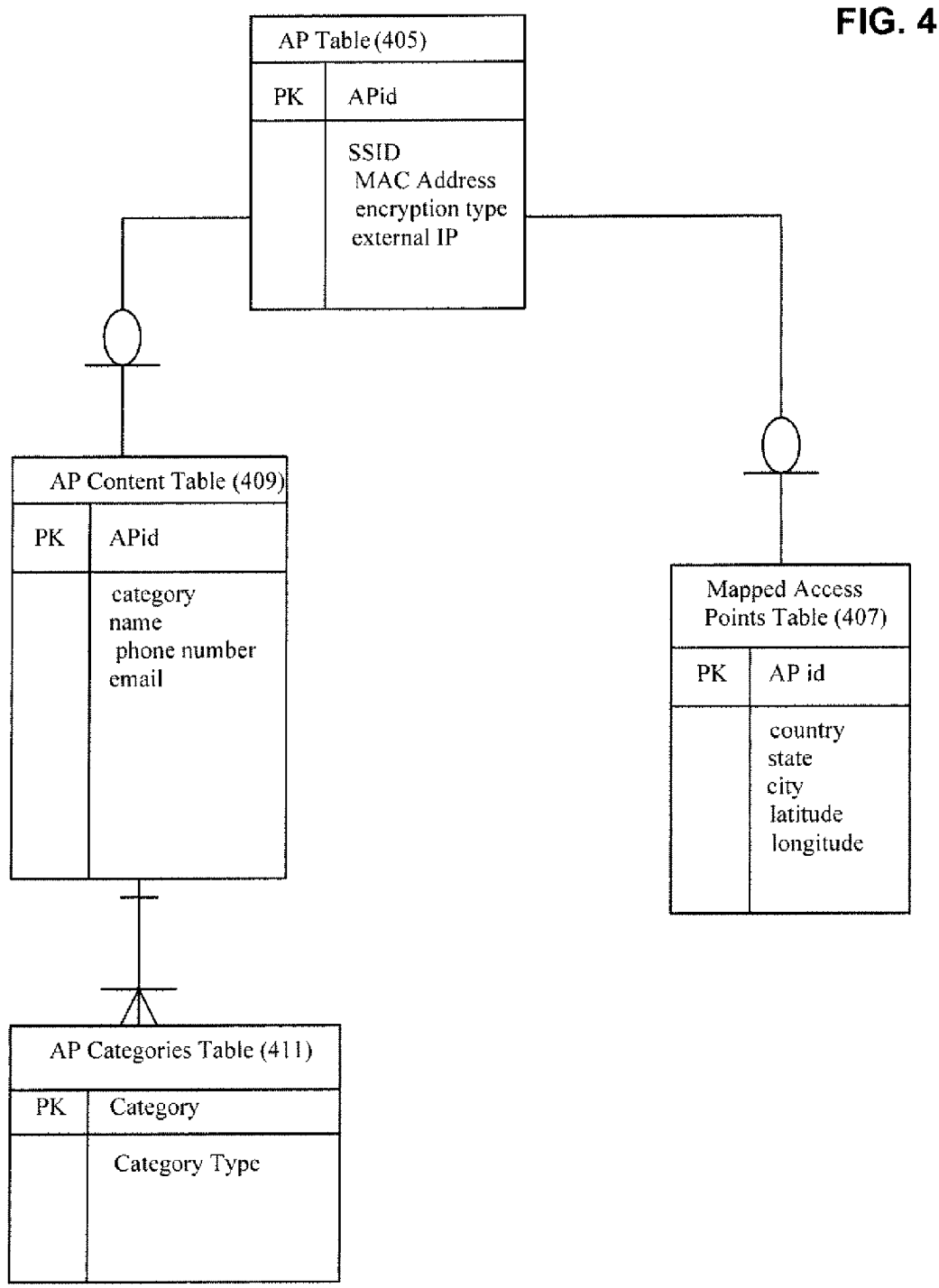
FIG. 4 illustrates relationships between a number of databases and tables in a schema.

As shown in FIG. 4, AP table 405, mapped access points table 407, and hotspots table 409 have different details on the same access point. Therefore, they may use the same primary key, such as the AP id with a one-to-one relationship between them. However, if there are cases where the mapped AP or the AP content records are missing, there will be no corresponding records in these tables to the records in the AP table 405. AP content table 409 and AP categories table 411 have a one-to-many relationship as one access point may have more than one category assigned to it. The relationships between the tables are illustrated in the schema shown in FIG. 4.

As outlined above, once the category identifier associated with the network access point is determined, the system and method of the present invention creates a resource classification database record in step 318.

The resource classification database record is used along with other available databases, search engines, and auxiliary data sources 139 to classify Wi-Fi access points and hotspots. These classification search engines provide data that may be applied to the access point attributes to further characterize the access points. The classification search engines may include chamber of commerce information search engines, consumer review search engines such as Hospitality database, Angie's List®, Consumer Reports®, Checkbook®, and the like. Business characterization search engines such as Yahoo® or Google® or Dun & Bradstreet®, and the like, may be used to retrieve business information as well.

In optional step 320, establishment characteristics may be determined based upon network attributes and auxiliary data to further characterize network access point 129. This auxiliary data classification information may include establishment characteristics of the hotspot location of the network access point, including a type of establishment and performance characteristics associated with the network access point of the establishment.

The performance characteristic may include average data speed, variance of data speed, average operational distance (i.e., radio coverage) of the network access point, probability of a connection drop, stability of service, number of connection trials, ease of connection, popularity, number and duration of unique connections in a predetermined time period, and the like.

The establishment characteristics may include a type of establishment such as a coffee shop, restaurant, doctor's office, university, and the like as well as a location address, an indication whether the establishment is part of a chain of establishments, a business registration number, a size of the establishment, an indication of the hours of operation, a demography served, a year established, and a proximity to an educational facility.

The establishment characteristics may also include the type of access point that exists at the establishment's hotspot location. For example, the type of access point may include an indication as to whether the access point is locked or open, whether the access point is free to use or if a fee is to be paid, whether there is direct access to a communication network or if a landing page access is employed, whether it is an access point provided by an ISP, whether the access point is intentionally public, and other similar characteristics of the hotspot location.

As mentioned above, facilitating automatic Wi-Fi connections may depend on the ability of a system to ensure that the target hotspot is an "intentionally public" access point, or that the hotspot provides otherwise legitimately available resources while preventing un-authorized accessing of random network resources. Intentionally public refers to a hotspot that is deliberately placed to allow the public Internet access. For example, many coffee shops, restaurants, "Internet cafes," and the like provide public access to the Internet to attract customers. Users that manually report on the nature of the hotspots' associated establishments may manually identify a number of these hotspots that provide intentionally public access. However, the automated process of the present invention is needed to locate, determine, and encompass a substantial percentage of this type of network access point.

By combining the network attributes in the access points database 105 with auxiliary data from a Web search or the like, the system and method of the present invention determines the hotspot type and characterizes the network access point. Users may employ network attributes as parameters for searching for additional information regarding discovered hotspots. Once search results are obtained, additional performance attributes can help further characterize the hotspots.

In one embodiment of the present invention, auxiliary data sources 139 such as search engines and publicly available databases retrieve all establishments that are likely to provide intentionally public Wi-Fi. These establishments may include coffee shops, restaurants, hotels, bars, hair salons, food shops, and the like. A database table in auxiliary database 111 is created for each establishment type or an aggregate table is created for all Wi-Fi likely providers. A table index can include location coordinates, addresses, business registration numbers, and the like. For each entry in the table, a set of attributes may be obtained using auxiliary data sources 139, such as search engines, dedicated Web sites, commercially-provided databases, and the like. These attributes may include a location address, location coordinates, name, whether the location is part of chain, a determination as to the likelihood that the establishment has Wi-Fi access, a type of establishment, whether the location is downtown, the proximity to education facilities such as a university or high-school, or the like. The attributes may further include the size of location, the number of tables or chairs, the popularity of the location, the type of food, whether drinks are served, the type of establishment such as a food store, a clothing store, and the like. The attributes may also include the hours of operation, the typical demography served, and the year the location was established.

The auxiliary database record may be indexed in optional step 322 by MAC address, for example. To each access point, attributes classifying the access point and corresponding hotspot may be attached. Examples of these attributes attached to the access point in resource classification database record include the SSID, the MAC address, location (coordinates, address), owning organization (ISP, community organization, company, etc.), backhaul speed, security type, login type (landing page, open), paid versus free access, the address from IP conversion (such as a general area, city, and the like. Attributes attached to the access point in the resource classification database record may also include a white list indication (for example, SSID names that are categorized as public, such as HHONORS), a black list indication (for example, SSID names such as Linksys and NETGEAR. Additional attributes include establishment type (such as a café, restaurant, hotel, university, and the like as well as a city or region name such as San Francisco, and the number of different clients and mobile communication devices connected to the access point during a given period.

The records in access points database 105, category database 111, and auxiliary database 107 may be used to generate a set of decision rules to be stored in rules database 109. For each establishment's neighborhood, for example within a radius of less than 2 km, the system and method of the present invention may check for the presence of an access point from the AP table 405 in access points database 105. Further, the system and method of the present invention may execute a search query to establish association between the SSIDs and the selected establishment. Based on the association, the system and method of the present invention may evaluate predefined rules in step 324. These rules may include determinations as to whether search results exist, an SSID is in search result name, the SSID length is greater than a certain number of characters, the SSID is greater than a certain number of words, the SSID is not in a black list, the SSID is in a white list, there is a specific word in the SSID string (for example, café, restaurant, university, and the like), there is a specific word in the organization (for example, university), there is a specific word in the result body, the physical distance between the establishment and access point location is less than a certain distance, the SSID includes an establishment name or visa versa, and the likelihood of providing free/paid Wi-Fi .

The likelihood of providing Wi-Fi can be estimated by similarity. For example, if several coffee shops with a given demography are determined to have free Wi-Fi for their customers, the system and method of the present invention may deduce that similar coffee shops are likely to provide free Wi-Fi as well. Some establishments are known to provide Wi-Fi hotspots (for example, Peets coffee, Panera Bread, etc.). The system and method of the present invention may use this knowledge to deduce the availability of Wi-Fi in other branches of these businesses.

The rules may further include determinations as to whether the SSID includes only capital letters (indicating abbreviations), whether the access point is locked or open, whether the access point uses a landing-page or is open, the type of landing page used, whether a user entered a category, location of the access point, the grade of the access point, and whether multiple SSIDs with the same name exist. After evaluating the rules, resource classification database record in database 103 may be updated.

In another embodiment of the system and method of the present invention, the rules determination may begin with the access points database 105, where search queries revolve around the SSID and its estimated location. In this case a search query may begin, for example, with parameters such as SSID and location (street address, city, coordinates etc.). The rules may be similar to the previous embodiment, including determinations as to whether the SSID includes only capital letters (indicating abbreviations), whether the access point is locked or open, whether the access point uses a landing-page or is open, the type of landing page used, whether a user entered a category, location of the access point, the grade of the access point, and whether multiple SSIDs with the same name exist.

Based on the association, the system and method of the present invention may evaluate predefined rules. These rules may include determinations as to whether search results exist, an SSID is in search result name, the SSID length is greater than a certain number of characters, the SSID is greater than a certain number of words, the SSID is not in a black list, the SSID is in a white list, there is a specific word in the SSID string (for example, café, restaurant, university, and the like), there is a specific word in the organization (for example, university), there is a specific word in the result body, the physical distance between the establishment and access point location is less than a certain distance, the SSID includes an establishment name or visa versa, whether the establishment is categorized as a business, whether results are available when separated by capital case and lower case to words.

The rules may further include determinations as to whether the SSID includes only capital letters (indicating abbreviations), whether the access point is locked or open, whether the access point uses a landing-page or is open, the type of landing page used, whether a user entered a category, location of the access point, the grade of the access point, and whether multiple SSIDs with the same name exist.

For each set of rules, a category identification may be made using a weighted average of a number of rules based on the rules' relevancy and indication strength. The system and method of the present invention calculates a weighted sum as follows and assigns a grade.

$$Rule1*Weight1+Rule2*Weight2+\ldots+RuleN*WeightN=grade$$

The resulting grade is compared against a threshold value, and if the grade exceeds the threshold value, the access point hotspot is categorized according to the tested classification category, for example as an "intentional public" access point, and a category identifier is stored in access points category database 111. Sets of rules are used to make decisions and determinations with regard to the classification of the hotspots.

The rules determination processes may be executed off-line on data stored in the databases 105, 107, 109, 111, or in real-time by clients on mobile communication device 199. While the off-line processing is straightforward as above, real-time processing requires the client to retrieve establishment information using searches or known databases and checking the above rules in the client. Other embodiments may include a combination of server and client operations.

To illustrate the effectiveness of the system and method of the present invention, an example of one implementation is discussed below. To begin, the system and method of the present invention may define "white" and "black" SSID/organization lists. For example, the black list may include names that are either suspected to be private Wi-Fi resources such as Linksys, Default, Wireless, and the like such as described in Table 1 below:

TABLE 1

| SSID that have the word as part of the name in the following way: (not case sensitive) | SSID with the specific name (no case sensitive) |
|---|---|
| 1  0% | WLAN |
| 2  zoom % | Wireless |
| 3  Wind Wireless % | WayportAccess |
| 4  % TPLINK % | TRENDnet |
| 5  SpeedTouch % | tmobile |
| 6  SpeedLinks % | test |
| 7  % roomlinx % | Starbucks |
| 8  Qwest % | PUBLIC |
| 9  premier % | optimumwifi |
| 10  network % | internet |
| 11  % netgear % | ibahn |
| 12  % motorola % | hotspot |
| 13  MEGABUS % | Guest |
| 14  % linksys % | goesh |
| 15  % Jumpstart % | attwifi |

Similarly, a white list may include names that are known to be "intentionally free Wi-Fi resources," such as those described below in Table 2.

TABLE 2

| SSID | Alias |
|---|---|
| 3 Palms | 3 Palms |
| AirPennNet | University of Pennsylvania |
| AIRWAY | AIRWAY |
| ALDACOS | ALDACOS |
| aloft | aloft hotel |
| AloftGuest | aloft hotel |
| AMX | AMX |
| ANY | ANY |
| APS | APS |
| ASUEMPLOYEE | Arizona state university |

TABLE 2-continued

| SSID | Alias |
|---|---|
| Asuman | Arizona state university |
| ASUS | Arizona state university |
| asuvisitor | Arizona state university |
| BCEC Wireless Network | Boston Convention and Exhibition Center |
| bestwestern | best western hotel |
| bestwestern nomadix | best western hotel |

In this implementation example of one embodiment of the present invention, the system and method avoids investigating black list items. For white list items, the system and method of one embodiment searches for an address as shown below.

The system and method pre-processes information beginning with both the SSID and organization names strings as follows.
1. Remove all ' and " signs
2. Remove everything after # include the # sign
3. Separate words by capital letters:
    i. "PublicCafe" becomes "Public Cafe,"
    ii. SFU remains SFU (no change is made if there is more than one capital letter),
    iii. Coffee Society remains Coffee Society (no change is made if words are separated with a space)

For the SSID, the following pre-processing operations may be conducted:
1. Replace _ and—with ' ' (space)
2. Add a space (if doesn't exists) before and after the words: "hotel", "café", "pizza", "university", "coffee", "holiday", "guest", "wirelessnet", "public", "state" (see below), "inn", "college".
Not estate, Not astate. If separated by capitals don't separate by state.
3. Remove ".com", ".net", ".edu", ".org", "Hotspot", "Network", guest, wirelessnet, public, WIFI, wireless, Wi, Fi, net, HS, wireless, Co, free, test, AP.
4. Use only first 3 words—do not include "of", "the", "and", "A" in the 3 word count
5. Replace "caf?" with "café"
6. Replace abbreviations with full name, according to a predetermined list—only make replacement if the abbreviation is the whole ss_id (no other words).

For the organization, the following pre-processing operations may be conducted:
1. Remove: " LLC", "COMPANY", "CORPORATION", "INC", "Network" if these words are used as a separated word.
2. Take only right side of DBA (doing business as). For example, "bla bla DBA Hilton" becomes "Hilton".
3. Remove everything after, .

Next, an embodiment of the present invention may create the following input, bulk, rules, blacklist, and whitelist database tables:

This input table is used as input to the classification process. The following table describes this table's entry:

TABLE 3

INPUT TABLE

| Field Name | Comments |
|---|---|
| SEQ | Sequence number-Auto increment |
| bulkID | General type: example: Coffee place without exact address |
| CNR | Resource number form WeFi main DB |
| SSID | AP name |
| SSID search | Modified SSID based on rules in section . . . |
| Organization name | Based on external IP list tables |

TABLE 3-continued

INPUT TABLE

| Field Name | Comments |
|---|---|
| Organization name for search | After changing according to section . . . |
| metro_country | Based on external IP |
| metro_state | Same |
| metro_city | Same |
| lat | From main database |
| longt | From main database |
| geo_country | From main database |
| geo_state | From main database |
| geo_city | From main database |
| geo_addr | From main database |
| full_address_search | Lat, longt or metro address if not mapped by users |
| google_action | Action required/not required |
| hospitality_database_action | Action required/not required |
| yahoo_action | Action required/not required |

In addition, the following bulk table shown in Table 4 may be used.

TABLE 4

BULK TABLE

| Field Name | Comments |
|---|---|
| bulkID | Auto increment |
| bulk_desc | Description of the bulk |

Similarly, the Rules table shown in Table 5, the Blacklist table shown in Table 6, and the Whitelist table shown in Table 7 may also be used.

TABLE 5

RULES TABLE

| Field Name | Comments |
|---|---|
| ruleID | Auto increment |
| rule_desc | Description of rule |
| is_active | |

TABLE 6

BLACKLIST TABLE

| Field Name | Comments |
|---|---|
| blacklistID | Auto increment |
| search_phrase | String to search in SSID |
| check_like | 0 = no (than check =), 1 = yes (than check like) |

TABLE 7

WHITELIST TABLE

| Field Name | Comments |
|---|---|
| whitelistID | Auto increment |
| search_phrase | String to search in ss_id |
| ssid_alias | Assigned ssid |
| Address | Assigned address |

The hotspot characterization rules may then be applied to the network attributes embodied in the above tables, along with auxiliary data, to determine a category identifier associated with the network access point. Examples of a number of auxiliary data, in the form of Web search queries, are shown below.

Example of a Web search query for auxiliary data directed to the Yahoo® Web site:

http://local.yahooapis.com/LocalSearchService/V3/localSearch?%params
a.     params = urllib.urlencode({'query': term,
        'results': num_biz_requested,
        'location': address_location,
        'radius': radius,
        'appid':appid,
        'output':out_method})
b.     params = urllib.urlencode({'query': term,
        'results': num_biz_requested,
        'latitude': lat,
        'longitude':longt,
        'radius': radius,
        'appid':appid,
        'output':out_method})
num_biz_requested='10'
radius='10'
appid=
'AI0FGzvV34HigtWh_ZejHDuECsqmFYrIJp0mIuYy9So3Ofk_Rv5B1-Yw0TbMD.UR3_viEMUw-'
out_method='json'

An example of a Web search query for auxiliary data directed to the Google® Web site:

http://www.google.com/base/feeds/snippets?%params
a.     params = urllib.urlencode({'q': term,
        'max-results': num_biz_requested,
        'bq': '[location: @'"+address_location+"' +' + radius + 'mi]',
        'alt':out_method})
b.     params = urllib.urlencode({'q': term,
        'max-results': num_biz_requested,
        'bq': '[location: @'+lat_sign+lat+longt_sign+longt+' +' + radius + 'mi]',
        'alt': out_method})
num_biz_requested='10'
radius='10'
out_method='json'

An example of a Web search query for auxiliary data directed to the Hospitality database Web site:

```
http://api.Hospitality database.com/business review search?%params
a.    params = urllib.urlencode({'term': term,
              'num_biz_requested': num_biz_requested,
              'location': address_location,
              'cc': cc,
              'radius': radius,
              'ySystem_ID':ySystem_ID})
b.    params = urllib.urlencode({'term': term,
              'num_biz_requested': num_biz_requested,
              'lat': lat,
              'long':longt,
              'cc': cc,
              'radius': radius,
              'ySystem_ID':ySystem_ID})
num_biz_requested='10'
cc='US'
radius = '10'
ySystem_ID='3DFSc0hPGyDqhg4QkkWzEg'
```

Google Base api input and output can be found in a URL, such as:

http://code.google.com/intl/iw-IL/apis/base/docs/2.0/at-trs-queries.html

The following fields may be stored for Google Base api results:
1. Title
2. location
3. country
4. lat
5. longt
6. Content
7. Category, type
8. phone
9. author
10. Updated
11. review type
12. link Similarly, Hospitality database api input and output can also be found in a URL, such as:

http://www.Hospitality database.com/developers/documentation/search_api

The following fields may be stored for Hospitality database results:
1. name
2. Address1, address2, address3
3. Neighborhood Name
4. City
5. state
6. state_code
7. country
8. country_code
9. zip
10. Lat
11. Longt
12. Distance
13. Is_closed
14. Category1, Category2, Category3, Category4, Category5
15. Review_count
16. avg_rating
17. Phone
18. url Further, Yahoo api input and output can be found in a URL as well, such as:

http://developer.yahoo.com/search/local/V3/localSearch.html

The following fields may be stored for Yahoo results:
1. Title
2. Address
3. city
4. State
5. Lat
6. Longt
7. distance
8. Category1, Category2, Category3, Category4, Category5,
9. totalReviews
10. TotalRating
11. LastReviewDate
12. url
13. BuisnessUrl
14. phone To evaluate rules to be used in determining category identifiers associated with network access points based upon these hotspot characterization rules and auxiliary data, the above API results and sets of information responses described above may be tested by evaluating:

1. Are the SSID or derivatives thereof included in the result?
2. Does the SSID or organization name (out of external IP tables) include strings like "coffee", "food", "drinks", "restaurant", "university", "library" or other words that points to free Wi-Fi locations?
3. Does the organization name (out of external IP tables) include names known to be providing free Wi-Fi (universities, hotel chains, coffee shops chains, Food chains etc.)?
4. Is the city & state in the query identical to the city & state in the result?
5. Is the category in the result equal to the category in the query?
6. Determine the distance between the location in the query to the location in result. If the distance is shorter than a predetermined threshold, confirm the result as positive.
7. When more than one address is returned in results, select the address closest to the address specified in the query.

In cases where the SSID or organization names may not be identical to establishments' names, the system and method of one embodiment of the invention may check the following:

1. If SSID/organization and result's name includes several words, the system and method may test the distance between them by comparing how many words are identical and divide by total words number to determine match.
2. Use an edit distance formula such as Levenshtein's distance formula, for example, the system and method of one embodiment may measure the difference between two texts strings to divide the number of characters that differs between the strings by the sum of all characters to determine match.

In the example implementation, an output table may be created based upon the various inputs described above. The output table may be shown as below in Table 8.

TABLE 8

OUTPUT TABLE

| Field Name | Comments |
| --- | --- |
| seq | Sequence number-Auto increment |
| bulkID | Explained above |
| processID | Used by the program to mark the rows it is working on. |
| cnr | From CDBMOAP |
| search_on_type | The search engine:<br>1 = google<br>2 = Hospitality database<br>3 = yahoo<br>4 = internal DB |
| result_number | out of several provided by the #Result Yahoo search/eHospitality_database/Google |

TABLE 8-continued

OUTPUT TABLE

| Field Name | Comments |
| --- | --- |
| Name | Name of location |
| Address1 | (street address, example) 1Address type |
| Address2 | (corner of streets, example) 2Address type |
| Address3 | (park section, example) 3Address type |
| Country | |
| Country code | |
| State | |
| State code | |
| City | City name |
| Latitude | Coordinates |
| Longitude | Coordinates |
| Distance | ? |
| Category1 | Type of estabishment |
| Category2 | |
| Category3 | |
| Description | |
| Map | |

The output table may then be used as the basis to test a hotspot and access point for network resources. If the test is positive, the system and method of the present invention categorizes the hotspot and determine its exact address.

Another example implementation of the system and method of the present invention relates to the case where multiple SSIDs or Business Names exist in the location of the mobile communication device. In many cases, an SSID is found multiple times at either different locations or in similar locations. For example, this may be the case in establishments such as universities, hotel chains, and the like. If one of the SSIDs is identified to be public/free, the system and method of the present invention may conclude the nature of the locations without the need for individual verification. Also, the system and method of the present invention may determine the establishments and the addresses.

The system and method of the present invention provides a technique to execute automatic connections using the hotspots that have been classified, Once a database of intentional-public (or otherwise classified) hotspots is available, the system and method of the present invention delivers this information to the Wi-Fi connection manager client. Delivery may be affected by using either a real-time query by the client, or by caching the information into a client's memory. As outlined above, a client device may be the mobile communication device previously described. Of course, other client devices may also be used.

To deliver the information using a real-time query, once a client scans a potential Wi-Fi resource (SSID, MAC address, signal strength, for example), the client reports this information to the resource classification server 101 and receives a resource classification characterizing the detected network access point. That is, the user receives an "opinion" regarding the discovered resource. The exchange with the server 101 can be executed over "out of band" connections, for example a cellular data channel. If a cellular data channel is not available, the exchange may commence once a Wi-Fi connection is achieved, for example, with another Wi-Fi resource.

To deliver the information using a caching query, where mobile communication device 199 is connected to the Internet from time to time at a home, an office, a visiting location, a hotel, and the like, access point attributes may be transferred to/from resource classification server 101 automatically or upon user request. For example, a user arrives for a visit in New York for few days on business trip. When the user arrives at the business location, the user receives a password to access a business communication network to facilitate Internet access. Once Internet access has been accomplished, the client may relay its location to the resource classification server 101 using IP, cell-ID, and the like and inquire about local Wi-Fi access points that have been classified. In response, the server 101 selects a section in the resource classification database 103 that is relevant to the user's current location, such as the city or the region, for example, and transfers the resource classification characterizing the network access points to the mobile communication device. For example, the resource classification server selects a set of hotspots in the client's neighboring location and transfers the classified hotspot information to the client.

Figure 5:
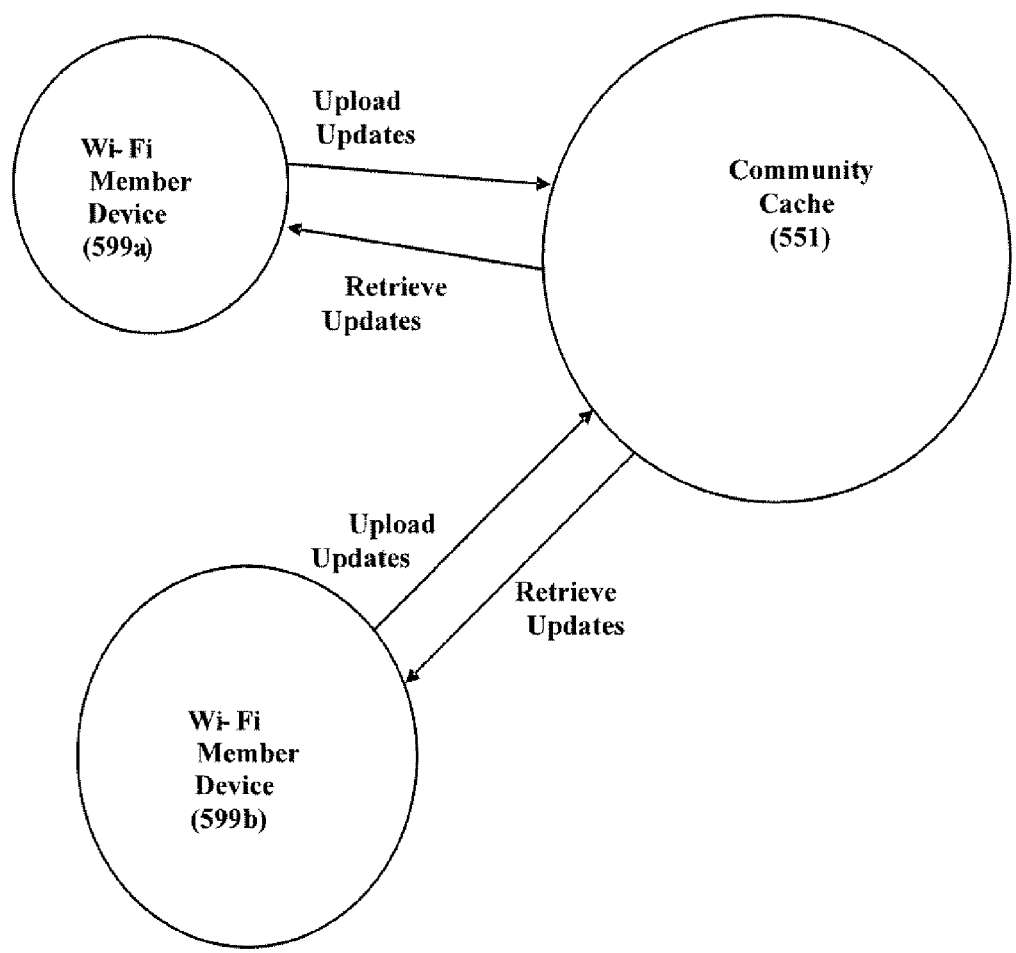
FIG. 5 illustrates information flow between a community member and the community cache.

Users of a system and method in accordance with one embodiment of the present invention may implement a community caching feature that provides the ability of community members to share mutual content by subscribing to a particular community of users. As shown in FIG. 5, subscriber member devices 599a, 599b gather content such as access point attributes and upload the content to community cache 551. Similarly, community cache 551 provides updates to subscriber member devices 599a, 599b with changes in relevant subsets of mutual content resident in community cache 551, via a retrieval process. The community cache 551 may be integrated with the resource classification database 103 or may work in conjunction with resource classification database 103 but reside in a physically separate data storage device. In this fashion, a portion of the resource classification database 103 may be cached in the client device that may permit the client device to function independently for a period of time. The portion of the database to be cached may be determined by the current location of the client device. This location determination may also be performed via cellular connection or other network access process.

The retrieval of content from the community cache 551 may be location based, where the relevant information subset is associated to the subscriber member device 599a, 599b according to the geographical locations of the devices 599a, 599b.

Figure 6:
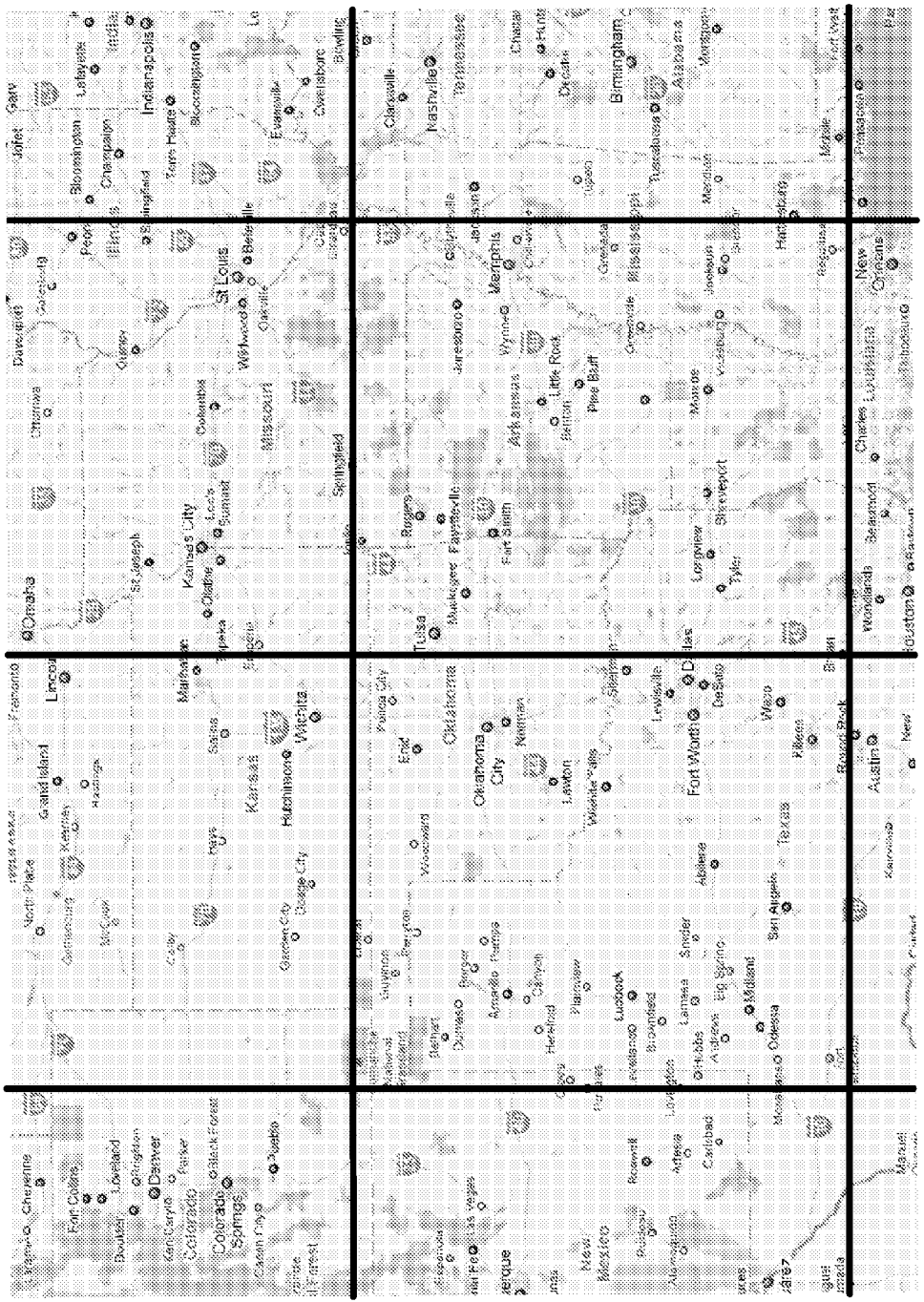
FIG. 6 illustrates a partitioned geographic region used in implementing a community cache in accordance with the present invention.

To exchange content, including access point network attributes, a geographic region is divided into partitions as illustrated in FIG. 6. An initial set of partition borders may be determined by dividing the geographical map into fixed squares. The size and shape of the partitions may be adjusted to accommodate data transfers and other system limitations with regard to file sizes and numbers of data.

The community cache 551 includes accessible hotspot and access point information associated with the geographically partitioned areas. The access point information may include accessibility information, classification resource database records, and the like that are a portion of the resource classification database 103.

Once Wi-Fi resources in reach are classified, if at least one access point is recognized as an "intentional public" access point or is otherwise determined to be legitimately accessible, such as an ISP with whom a service agreement exists, the mobile communication device client attempts to associate with these access points. The mobile communication device client begins with the access point with the highest signal level (based upon RSSI). Once successfully connected, the mobile communication device may disconnect itself from the primary connection such as the cellular data channel, and continue to access the Internet over the Wi-Fi network. If, for some reason, a connection has not been established, the mobile communication device client will direct the mobile communication device to connect with the next highest signal level access point, and so on. When a connection is established, the mobile communication device client starts an exchange with the community cache on the resource classification server, further improving the resource's database.

Figure 7A:
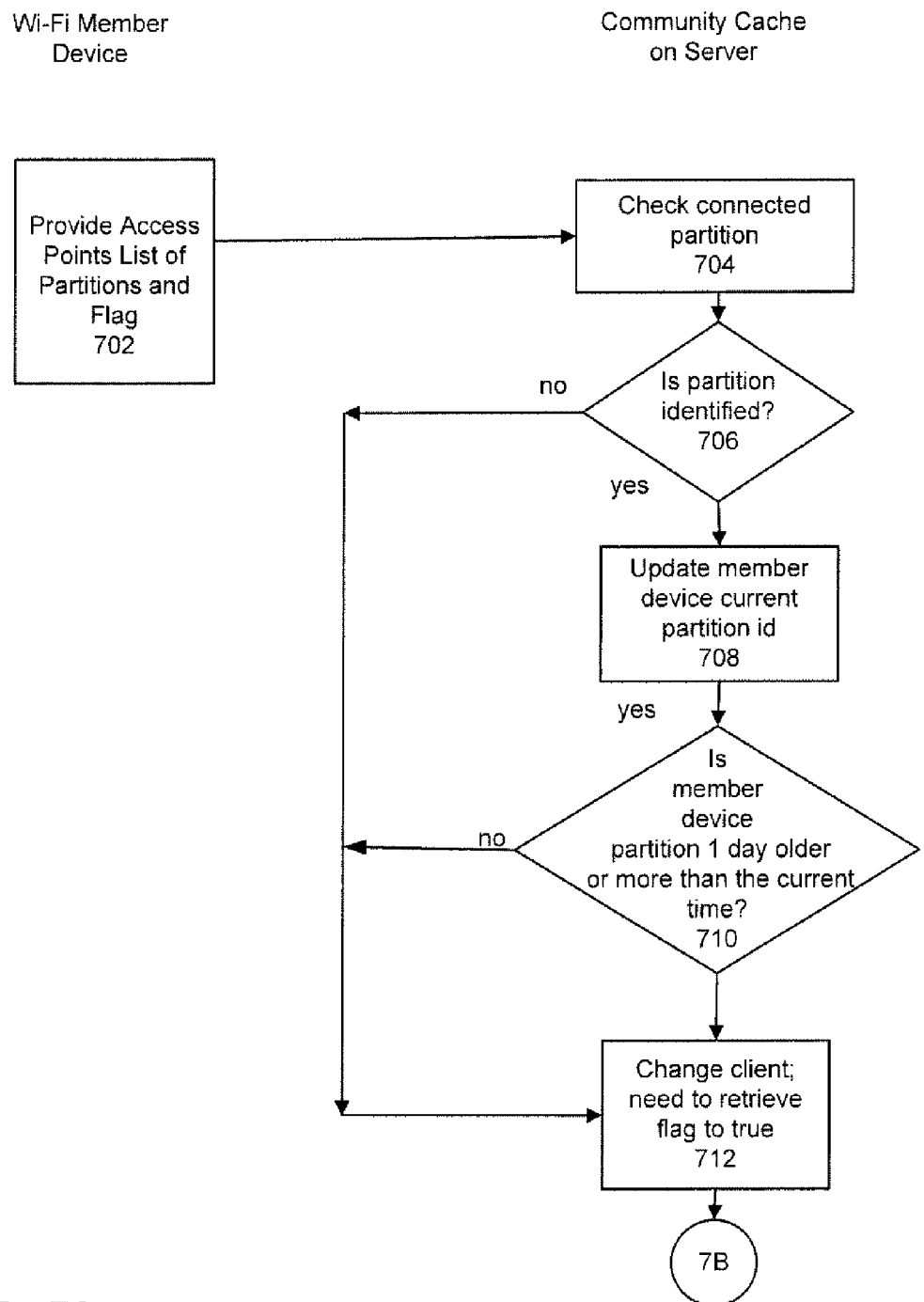
FIGS. 7A-7C show a process flow diagram between a client and server in implementing a community cache in accordance with the present invention.

During the upload operations shown in FIG. 7A, in step 702 subscriber member devices 599a, 599b provide an access point list of partitions to server 551. In step 704, server 551 checks the connected partition. If the partition is identified in step 706, the client current partition is updated in step 708, and in step 710, the server checks to determine if the member device partition is one day older or more and has been updated. If the member device partition is one day older or more and has been updated, the process continues to step 714. If the partition is not identified in step 706 above, the process passes directly to step 714 in FIG. 7B.

Figure 7B:
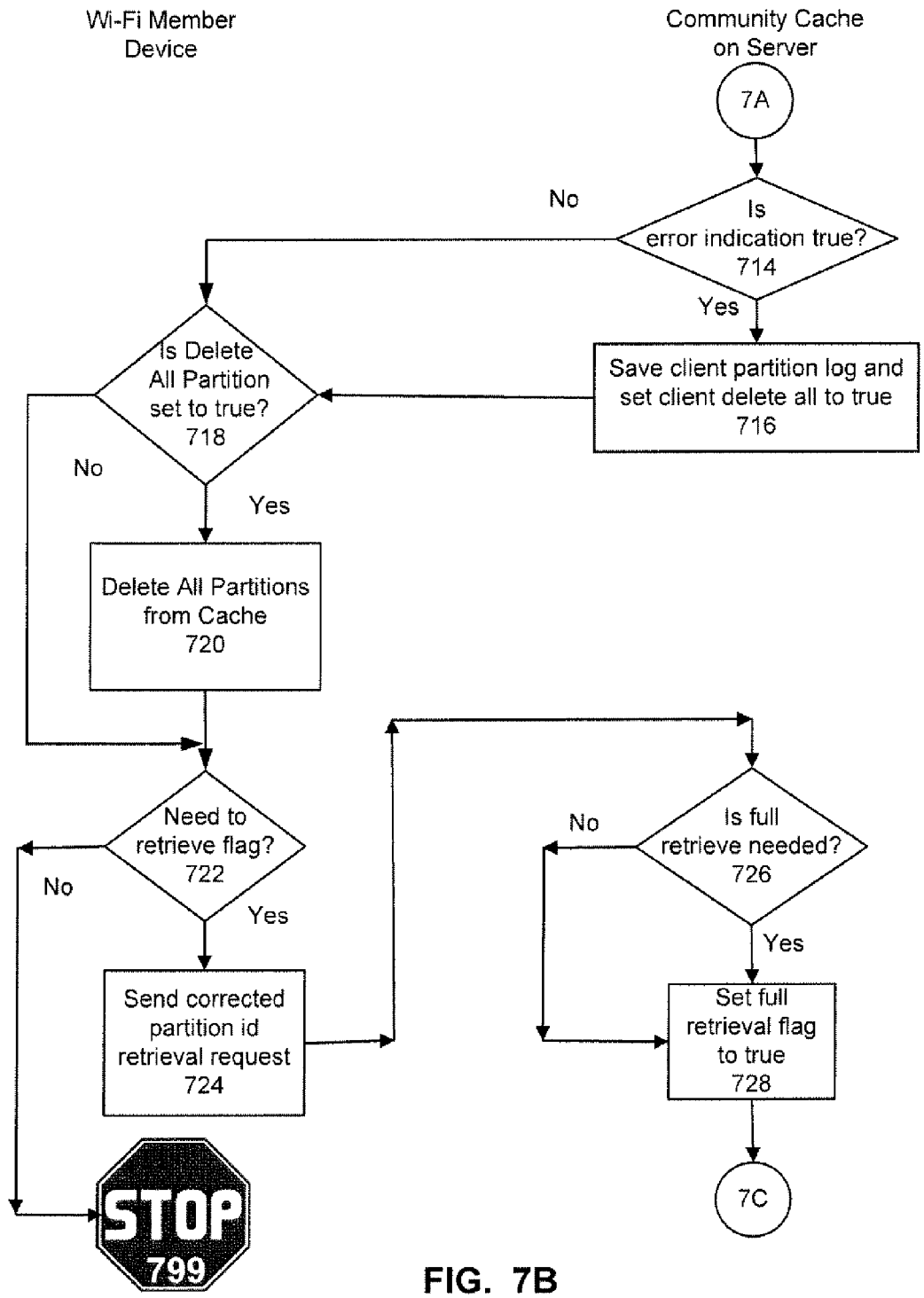

In step 714 in FIG. 7B, the community cache on the server checks to see if the error indication is true. If the error indication is true, the client partition log is saved and the client delete all flag is set to true in step 716. If the error indication is not true, the process passes directly to step 718 without saving the client partition log or setting the client delete all flag to true.

In either case, in step 718, the subscriber member device checks to see if the delete all partition is set to true. If so, the delete all partition is deleted from the cache in step 720. If the delete all partition is not set to true, the process passes directly to step 722 where the Wi-Fi member device checks to determine if it needs to retrieve a flag. If a flag needs to be retrieved, the process sends a connected partition id retrieval request to community cache on the server in step 724 and control and passes back to the community cache. If a flag does not need to be retrieved, the process ends in step 799. If a flag is to be retrieved, once control passes to the community cache, in step 726 the community cache checks to see if a full retrieve is necessary.

Figure 7C:
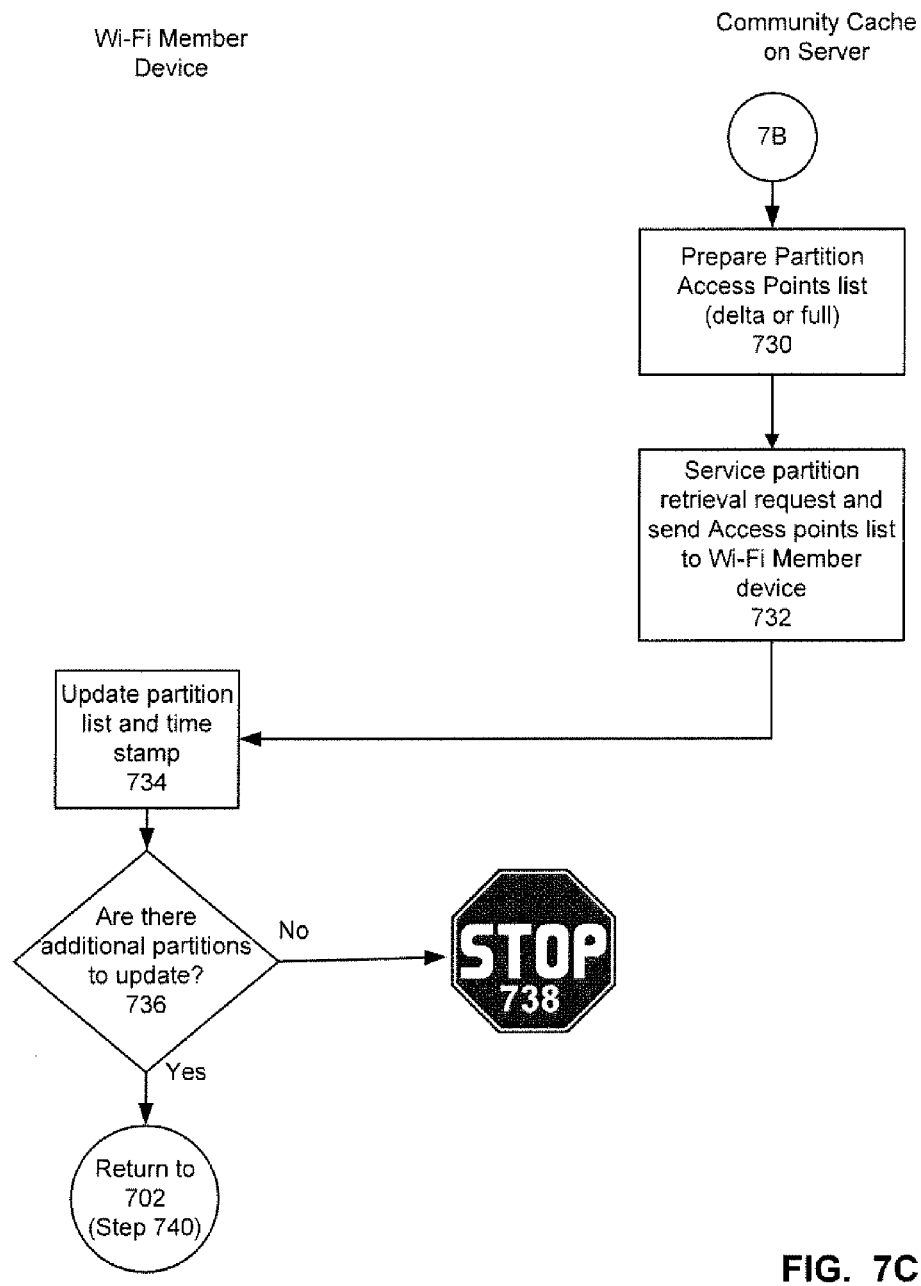

If a full retrieve is needed, the full retrieval flag is set to true in step 728, and the process continues to step 730 in FIG. 7C where the partition access points list is prepared. If a full retrieve is not needed, the process continues directly to step 730 in FIG. 7C. In either case, the partition access points list is prepared, and in step 732 the partition retrieval request is serviced, and the access points list is sent to subscriber member device.

In step 734, the partition list and time stamp is updated. In step 736, Wi-Fi member device checks to see if there are additional partitions to update. If there are no additional partitions to update, in step 738, the process ends. If there are additional partitions to update, the process returns to step 702 and re-commences.

The system and method and computer program product of the present invention was developed to seamlessly and automatically connect a mobile communication device to a network using a communications resource database. Until the systems and methods of the present invention, no automatic switching to characterized intentionally public communications networks was possible. The present invention presents a significant advancement over techniques to utilize Wi-Fi networks and to classify access points to the networks. The foregoing description of the present invention provides illustration and description, but is not intended to be exhaustive or to limit the invention to the precise one disclosed. Modifications and variations are possible consistent with the above teachings or may be acquired from practice of the invention. As such, the scope of the invention is defined by the claims and their equivalents.

What is claimed:

1. A computer-implemented method of automatically connecting a mobile communication device to a network, the method comprising:

detecting at least one communication network access point using the mobile communication device;

transmitting one or more network attributes associated with the at least one communication network access point to a resource classification server;

receiving from the resource classification server, by the mobile communication device, a resource classification characterizing the at least one communication network access point, the resource classification including a category identifier that is determined based on the one or more network attributes and auxiliary data, wherein the auxiliary data is identified by the resource classification server from at least one of a chamber of commerce search engine, a consumer review search engine, or a business characterization search engine, using a search query generated based on the one or more network attributes; and connecting the mobile communication device to the at least one communication network access point based upon the received resource classification.

2. A computer-implemented method of classifying wireless network resources, the method comprising:

receiving, by a resource classification server, at least one network attribute, the at least one network attribute associated with at least one communication network access point;

analyzing, by the resource classification server, the at least one network attribute;

determining, by the resource classification server, auxiliary data related to the at least one communication network access point from at least one of a chamber of commerce search engine, a consumer review search engine, or a business characterization search engine, using a search query generated based upon the analyzing of the at least one network attribute;

applying hotspot characterization rules to the at least one network attribute and to the auxiliary data; and determining a category identifier associated with the at least one communication network access point based upon the applied hotspot characterization rules and the auxiliary data; and creating a resource classification characterizing the at least one communication network access point, the resource classification including the category identifier.

3. The method of claim 1 or 2, wherein the category identifier includes at least one of intentionally free wireless Internet access, paid Internet access, home wireless Internet access, office wireless Internet and local access, guest wireless Internet access, contracted ISP Internet access, or cellular carrier Internet access.

4. The method of claim 2, wherein the auxiliary data includes a list of establishments and their locations and the method further comprises checking availability of Wi-Fi resources with a user terminal at an establishment location.

5. The method of claim 1 or 2, wherein the network to which the mobile communication device is connected includes at least one of a Wi-Fi network or a cellular communication network.

6. The method of claim 1 or 2, Wherein the mobile communications device includes at least one of a smart phone, a laptop computer, a netbook computer, or a cellular handset.

7. The method of claim 1, wherein detecting a communication network access point includes scanning a radio neighborhood with the mobile communication device to evaluate network access points.

8. The method of claim 1, wherein detecting a communication network access point further includes:

associating with the network access point to receive network information;

accessing the network based upon the received network information; and determining network attributes based upon the accessed network.

9. The method of claim 8, wherein the determined network attributes include at least one of SSID, MAC address, external IP, gateway IP, or DNS.

10. The method of claim 9, wherein at least one of SSID, MAC address, external IP, gateway IP, or DNS is used to determine an owner of the access point network.

11. The method of claim 1 or 2 wherein the reported network attributes include at least one of SSID, radio MAC address, average and variance of signal strength as measured through multiple connections, external IP, Gateway IP, DNS server, number of connected users per time period, encryption type, whether Internet access had been verified, type of login, amount of data delivered, date first detected, date last detected, average and variance of data speed as measured through mobile connections, owning organization, location, geographical coordinates, street address, IP location, information source, detecting terminal, user name, external database, average or variance of users' connection time as calculated over multiple connections, WISPr login details.

12. The method of claim 1, further comprising:
relaying, by the mobile communication device, the location of the mobile communication device; and
inquiring, by the mobile communication device, about local network communication access points at the location of the mobile communication device that have been classified.

13. The method of claim 2, further comprising:
selecting a resource classification characterizing network access points at a location of a mobile communication device; and
transferring the resource classification characterizing network access points to the mobile communication device.

14. The method of claim 1, wherein connecting the mobile communication device includes:
connecting to a network resource that has been classified based upon the received resource classification.

15. The method of claim 2, wherein analyzing the stored network attributes includes:
determining a geographical location of the detected network access point as a hotspot; and
storing the determined hotspot in a mapped hotspots database.

16. The method of claim 15, wherein the geographical location includes at least one of global positioning data, a cell based location, and an IP location, or wherein the cell-based location includes a location calculated based on the location of cellular base stations.

17. The method of claim 1 or 2, wherein the auxiliary data includes establishment characteristics of the network access point.

18. The method of claim 1 or 2, wherein the auxiliary data includes an owner's approval of a Wi-Fi hotspot use for the public.

19. The method of claim 17, wherein the establishment characteristics include at least one of a type of establishment, location address, indication whether the establishment is part of a chain of establishments, business registration number, size of establishment, hours of operation, demography served, year established, or proximity to an educational facility.

20. The method of claim 1 or 2, wherein creating the resource classification includes determining a performance characteristic and a type associated with the communication network access point.

21. The method of claim 20, wherein the performance characteristic includes at least one of average data speed, variance of data speed, average operational distance of the network access point, probability of a connection drop, number of connection trials, or number and duration of unique connections in a predetermined time period.

22. The method of claim 20, wherein the type includes at least one of the nature of the hosting establishment where a hotspot is located, whether the access point is locked or open, whether the access point is accessed free-of-charge or for a fee, whether the access point is directly accessible by a mobile communication device or via a landing page, or whether the access point is owned or operated by an Internet Service Provider.

23. The method of claim 1, wherein transmitting the network attributes associated with the at least one communication network access point includes executing an out-of-band connection over at least one of a cellular data channel and a Wi-Fi resource.

24. The method of claim 2, wherein receiving the at least one network attribute associated with the detected network access point includes executing an out-of-band connection over at least one of a cellular data channel and a Wi-Fi resource.

25. The method of claim 1 or 2, wherein the resource classification includes an indication of whether the access point is an intentionally public network resource.

26. The method of claim 2 further comprising:
storing the received network attributes data in an access points database.

27. The method of claim 2 further comprising:
storing the auxiliary data related to the network access point in an auxiliary database.

28. The method of claim 2 further comprising:
storing the rules in a rules database.

29. The method of claim 2 further comprising:
storing the category identifier in a hotspots category database.

30. The method of claim 2 further comprising:
storing the resource classification in a resource classification database.

31. The method of claim 2, wherein at least one of the auxiliary data or the hotspot characterization rules are provided by a third-party resource provider.

32. The method of claim 31, wherein the third-party resource provider includes at least one of ISP, cellular carrier, education institute, hotel chain, or store chain.

33. A non-transitory computer-readable storage media for automatically connecting a mobile communication device to a network, the computer-readable storage media comprising one or more computer-readable instructions configured to cause one or more computer processors to execute the operations comprising:
detecting at least one communication network access point using the mobile communication device;
transmitting one or more network attributes associated with the at least one communication network access point to a resource classification server;
receiving from the resource classification server, by the mobile communication device, a resource classification characterizing the at least one communication network access point, the resource classification including a category identifier that is determined based on the one or more network attributes and auxiliary data, wherein the auxiliary data is identified by the resource classification server from at least one of a chamber of commerce search engine, a consumer review search engine, or a business characterization search engine, using a search query generated based on the one or more network attributes; and connecting the mobile communication device to the at least one communication network access point based upon the received resource classification.

34. A non-transitory computer-readable storage media for classifying wireless network resources, the computer-readable storage media comprising one or more computer-readable instructions configured to cause one or more computer processors to execute the operations comprising:

receiving, by a resource classification server, at least one network attribute, the at least one network attribute associated with at least one communication network access point;

analyzing, by the resource classification server, the at least one network attribute;

determining, by the resource classification server, auxiliary data related to the at least one communication network access point from at least one of a chamber of commerce search engine, a consumer review search engine, or a business characterization search engine using a search query generated based upon the analyzing of the at least one network attribute;

applying hotspot characterization rules to the network attribute and to the auxiliary data;

determining a category identifier associated with the at least one communication network access point based upon the applied hotspot characterization rules and the auxiliary data; and creating and storing a resource classification database record in a resource classification database characterizing the at least one communication network access point, the database record in the resource classification database including the category identifier.

35. A mobile communication device configured to:

detect at least one communication network access point;

transmit one or more network attributes associated with the at least one communication network access point to a resource classification server;

receive from the resource classification server a resource classification characterizing the at least one communication network access point, the resource classification including a category identifier that is determined based on the one or more network attributes and auxiliary data, wherein the auxiliary data is identified by the resource classification server from at least one of a chamber of commerce search engine, a consumer review search engine, or a business characterization search engine, using a search query generated based on the one or more network attributes; and connect to the at least one communication network access point based upon the received resource classification.

36. A resource classification server configured to:

receive at least one network attribute, the at least one network attribute associated with at least one communication network access point;

analyze the at least one network attribute;

determine auxiliary data related to the at least one communication network access point from at least one of a chamber of commerce search engine, a consumer review search engine, or a business characterization search engine, using a search query generated based upon the analyzing of the at least one network attribute;

apply hotspot characterization rules to the at least one network attribute and to the auxiliary data;

determine a category identifier associated with the at least one communication network access point based upon the applied hotspot characterization rules and the auxiliary data; and create and store a resource classification database record in a resource classification database characterizing the at least one communication network access point, the database record in the resource classification database including the category identifier.

37. The method in claim 1 or 2, wherein a resource is identified by at least one of MAC address or SSID.

38. The method of claim 1, further comprising:

relaying, by the mobile communication device, the location of the mobile communication device; and inquiring, by the mobile communication device, about local network communication access points that have been classified at the location of the mobile communication device.

39. The method of claim 2 further comprising:

selecting a resource classification characterizing network access points at a location of a mobile communication device; and transferring the resource classification characterizing network access points to the mobile communication device.

* * * * *